US008099458B2

(12) United States Patent
Burtner, IV et al.

(10) Patent No.: US 8,099,458 B2
(45) Date of Patent: Jan. 17, 2012

(54) WORKGROUP APPLICATION WITH CONTEXTUAL CLUES

(75) Inventors: E. Russell Burtner, IV, Everett, WA (US); Thomas Vaughan Gruver, Sammamish, WA (US); Edward W. Yip, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1261 days.

(21) Appl. No.: 11/260,515

(22) Filed: Oct. 27, 2005

(65) Prior Publication Data

US 2007/0100937 A1    May 3, 2007

(51) Int. Cl.
G06F 15/16  (2006.01)
G06F 15/173  (2006.01)
(52) U.S. Cl. ......... 709/204; 709/224; 709/226; 709/207
(58) Field of Classification Search .................. 709/204, 709/224, 226, 207
See application file for complete search history.

(56) References Cited

U.S. PATENT DOCUMENTS

| | | | |
|---|---|---|---|
| 6,192,395 B1 * | 2/2001 | Lerner et al. .................. | 709/204 |
| 6,670,970 B1 * | 12/2003 | Bonura et al. ................. | 715/768 |
| 2003/0142133 A1 * | 7/2003 | Brown et al. .................. | 345/768 |
| 2003/0158900 A1 * | 8/2003 | Santos .......................... | 709/205 |
| 2004/0128350 A1 * | 7/2004 | Topfl et al. .................... | 709/204 |
| 2005/0018828 A1 * | 1/2005 | Nierhaus et al. .......... | 379/202.01 |
| 2005/0088410 A1 * | 4/2005 | Chaudhri ....................... | 345/157 |
| 2006/0146765 A1 * | 7/2006 | Van De Sluis et al. ....... | 370/338 |
| 2008/0098328 A1 * | 4/2008 | Rollin et al. .................. | 715/810 |

FOREIGN PATENT DOCUMENTS

JP            04257046 A     *  9/1992

OTHER PUBLICATIONS

Greenberg, S., Roseman, M., Webster, D. and Bohnet, R. (1992) "Human and technical factors of distributed group drawing tools." Interacting with Computers, 4(1), pp. 364-392, December. Butterworth-Heinemann. (Special edition on CSCW, Tom Rodden ed.).*

* cited by examiner

Primary Examiner — Karen Tang
(74) Attorney, Agent, or Firm — Wolf, Greenfield & Sacks, P.C.

(57) ABSTRACT

A workgroup application with contextual clues. The workgroup application allows any one of multiple participants to provide input, such as commands to edit a document or speech. The effects of the input are presented to other participants in a workgroup session in conjunction with a participant indicator. As one example, each participant may control a cursor that is displayed on the display screens of workstations in a network hosting a workgroup application. Each cursor may be displayed in conjunction with a participant icon that follows the cursor on the display screens. Contextual clues may also be provided by modulating visual properties of the participant icons in response to activity level.

15 Claims, 6 Drawing Sheets

WORKGROUP APPLICATION WITH CONTEXTUAL CLUES

BACKGROUND

Computers and networks are widely used to enhance productivity in business environments. One way that productivity is increased is through the use of workgroup applications. Workgroup applications are software programs that allow multiple users, each using a computer workstation, to work collaboratively. Workgroup applications are traditionally implemented with a server component and a client component for each workstation to be used as part of a session of the workgroup application. The client workstations are connected to the server through a network, typically a Wide Area Network within an enterprise or the Internet.

The server component receives data and control information from the individual workstations and distributes that information to all of the workstations connected in the workgroup session. Each client component provides a local interface to the workgroup application for a participant. As part of the interface, the client component both presents information from other users and receives inputs from the participant. The client component processes these inputs and generates information that is transmitted to the server for distribution to other workstations connected in the workgroup application session.

Multiple users may connect to the server to create a workgroup session during which all of the participants view a shared work space. The participants may take turns editing a document or providing input to the shared workspace. Each participant contemporaneously views changes made by any other participant.

In some workgroup applications, the network interconnecting the client computers is also used to transmit voice or video signals. Participants in a workgroup application session may use this capability to talk with each other during a workgroup application session or share pictures or other video information.

Examples of workgroup applications that are commercially available include LIVE MEETING™ provided by Microsoft Corporation of Redmond, Wash., VIRTUAL OFFICE™ provided by Groove Networks, Inc. of Beverly, Mass. and WEBEX™ offered by WebEx Communications, Inc.

SUMMARY OF INVENTION

In one aspect, the invention relates to a workgroup application. As part of a workgroup application session created with the workgroup application, outputs generated in response to participant inputs are displayed in connection with a participant indicator indicative of the participant who provided that input. In a workgroup application in which any of multiple participants may provide input, participant indicators provide contextual clues allowing the participants to better follow the flow of the workgroup session.

In a workgroup application in which participants control cursors, a participant indicator may be associated with each cursor. The participant indicators provide a visual indicator of which participant provided input to control a specific cursor. Additionally or alternatively, participant indicators may be associated with other types of inputs, such as voice.

Participant indicators may be in a form that provides contextual clues other than the identity of a participant providing a specific input. Contextual clues may be provided by modulating a visual attribute of the participant indicator in response to the level of activity of a participant. A participant indicator may be visually accentuated to signal that a participant is providing input, such as speech. Conversely, a participant indicator may be visually deemphasized to indicate that a participant is not taking an active role in a workgroup application session.

The foregoing is a non-limiting summary of the invention, which is defined solely by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

We have recognized that workgroup applications can be improved by providing more contextual clues to participants in workgroup application sessions. Lack of contextual clues creates two seemingly contradictory problems as a workgroup application attempts to duplicate a physical meeting in a virtual environment. On the one hand, participants may receive insufficient information to fully follow the flow of the meeting. Information such as who is in attendance at a meeting, who is actively participating in an interaction during a meeting or who is making a particular edit to a document is usually readily apparent to participants in a physical meeting, but may not be apparent to a participant in a workgroup application session whose only connection to other participants in the workgroup session is through the user interface of their own workstation. On the other hand, contextual information may also be used during a physical meeting to help participants ignore comments or actions unrelated to the flow of the meeting. Providing more information without contextual clues creates a risk that participants could be overwhelmed by information, which could ultimately detract from the participants' experience using a workgroup application.

As described in more detail below, contextual information that may improve a participant's experience with a workgroup application is provided by participant indicators. The participant indicators enable participants to identify which participant is making edits to a document, is speaking or otherwise providing input to the workgroup application session. Participant indicators may also provide important context information relating to the activity levels of the participants in a workgroup session. Such context information may, for example, allow participants to focus on inputs provided by participants who are actively involved in an exchange during a workgroup application session.

Figure 1:
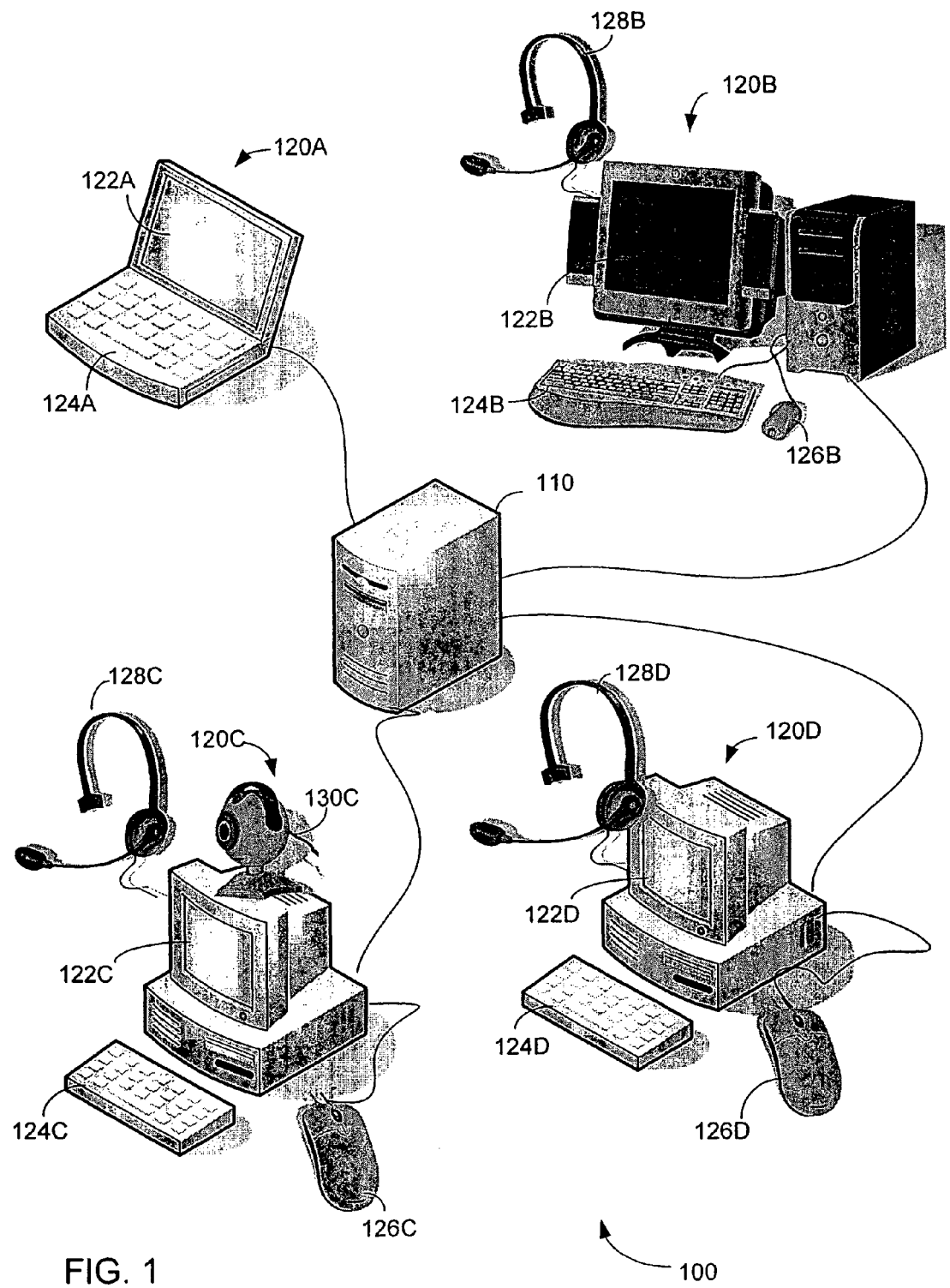
FIG. 1 is a sketch of a network on which a workgroup application according to the invention may be hosted.

FIG. 1 shows network 100 in which a workgroup application may be operated. Network 100 includes server 110 that may be programmed with a server-side workgroup application component. Network 100 includes multiple user workstations 120A, 120B, 120C and 120D. Each of the user workstations 120A . . . 120D may be programmed with a client-side workgroup application component. Both the client-side workgroup application component and the server-side workgroup application component may be implemented in any suitable way, including using techniques of conventional workgroup application programs as now known or hereafter developed. In the embodiment of FIG. 1, each of the user workstations 120A . . . 120D includes a user interface through which a participant accessing a workgroup application session through the workstation may provide input to and receive output from the workgroup application. Any suitable form of user interface may be used. Here, each user interface includes a display screen such as 122A, 122B, 122C or 122D. As the workgroup application operates, visual information may be displayed to each participant (not shown) of a user workstation 120A . . . 120D on a display screen 122A, 122B, 122C or 122D, respectively. In the embodiment described herein, the display screen on all user workstations connected in a workgroup application session display the same information. However, different information may be displayed at different workstations. For example, a client-side application program running on a user workstation may be implemented to present inputs received through the user interface of that work station differently than inputs received through other user workstations or to facilitate interactions among a subset of the participants in a workgroup application session.

The user interface of each user workstation is coupled to one or more input devices. During a workgroup application session, information input by a participant through any of the user workstations may appear on the display screen 122A . . . 122D of other user workstations or otherwise control the information presented to participants in the workgroup application session. In FIG. 1, each user workstation is equipped with a keyboard such as 124A, 124B, 124C or 124D, allowing a user to input textual information.

Each user workstation may alternatively or additionally be equipped with other user input devices. In the example of FIG. 1, user workstations 120B, 120C and 120D each includes a pointing device, such as a mouse 126B, 126C, 126D, respectively. As an example of other user input devices, input devices are not limited to mechanically operated input devices. For example, user workstations 120B, 120C and 120D are each shown with a headset 128B, 128C, 128D, respectively. Each of the headsets includes a microphone through which a human user may speak. A client component of the workgroup application may translate that speech into data that may be readily transmitted over network 100. For example, input provided as speech may be converted to digital data and transmitted over network 100 in a VoIP format to each of the other user workstations. The client component of the workgroup application at each user workstation receiving data representing speech may convert the speech to an audio signal that can be presented to a human user through a speaker on a headset, such as headset 128B, 128C or 128D, or presented to the human user through a free-standing speaker, such as speaker 130B.

Information in other formats may similarly be shared among participants in a workgroup application session. For example, user workstation 120C is shown equipped with webcam 130C. A human user of user workstation 120C may operate webcam 130C to take pictures or video clips that are shared with other participants in a workgroup session. Webcam images may be converted by the client component of the workgroup application running on user workstation 120 to digital form and transmitted over network 100 to each of the other user workstations connected in the workgroup application session. As a further example, input may be provided through a tablet, but any suitable input device, whether now known or hereafter developed, may be used.

Figure 2:
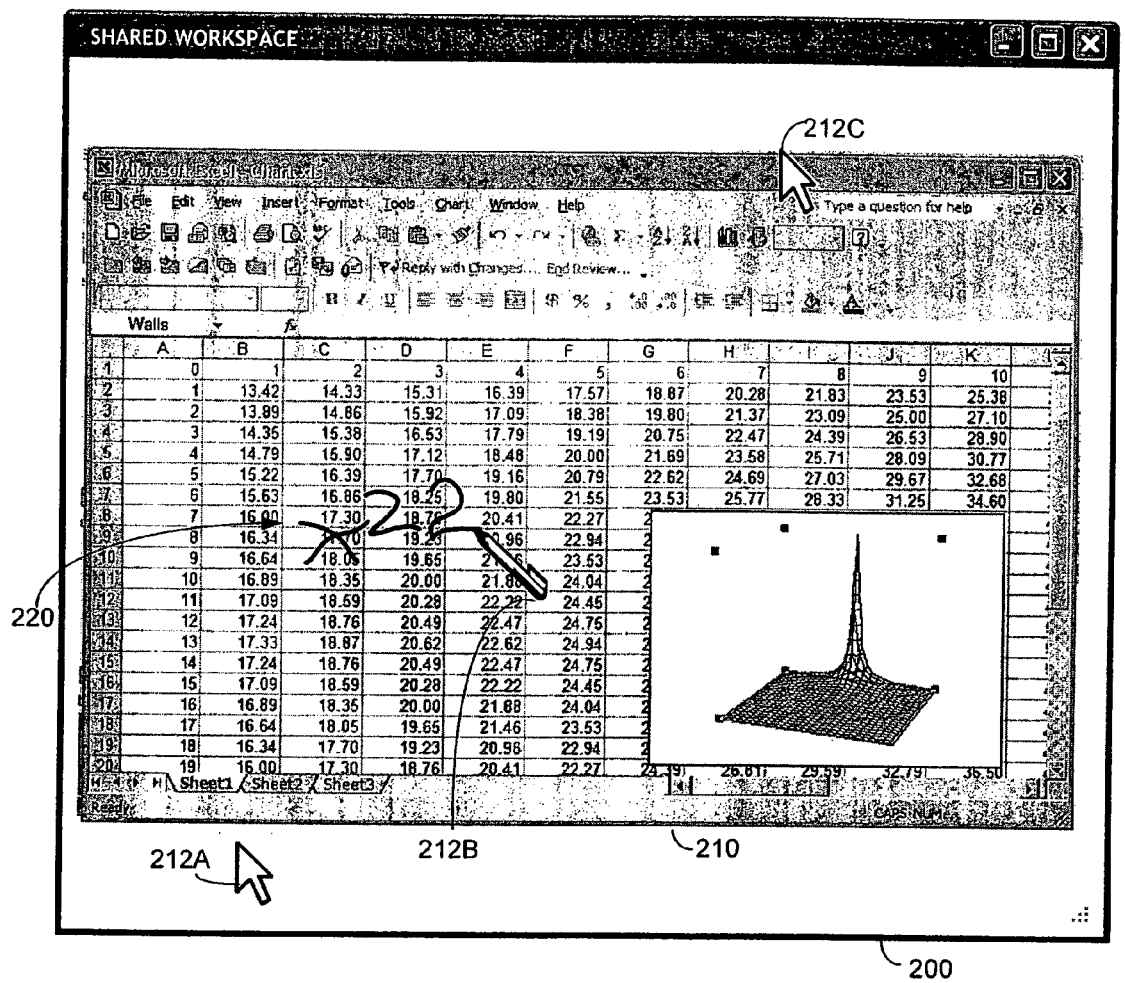
FIG. 2 is a sketch of a user interface that may appear on a user workstation during a workgroup application session.

Participant activity indicators are particularly desirable for workgroup application sessions in which multiple participants may fluidly (i.e., without express transfer of control operations) provide input or assert control over the information presented to other participants in the workgroup application session. FIG. 2 shows a user interface 200 that may appear on display screens 122A . . . 122D (FIG. 1) of user workstations connected in a workgroup application session in which any one of multiple participants may at any time provide input that is output to other participants. In this example, user interface 200 includes a document window 210 displaying a document on which multiple users in the workgroup application session are simultaneously working. In this example, the document is an EXCEL™ spreadsheet application document, but the concepts described herein are applicable to any application.

In the embodiment of FIG. 2, multiple cursors are shown. Here cursors 212A, 212B and 212C are shown. Though traditional workgroup application programs have generally included a single cursor with users sending and receiving command information to select, at any given time, a single participant to control the cursor, a workgroup application may be constructed in which each participant may concurrently control a separate cursor.

Computer applications that accept input from multiple users are known. For example, multi-player games are in widespread use. Technology used to allow game applications to respond to input from multiple users may be readily adapted to workgroup applications, allowing such applications to simultaneously obtain inputs from multiple participants in a workgroup session. Though FIG. 2 shows an embodiment in which each participant provides input, such as through a pointing device, to control a cursor, a workgroup application may be constructed to allow each user to provide input in any desired format. For example, a user may mechanically manipulate a mouse, type text through a keyboard, or provide input to the workgroup application session in any way that a user may otherwise provide input through a user workstation. Regardless of the specific format in which input is provided, inputs provided by all participants may collectively define the information presented to each participant.

Each cursor may have a shape representative of the nature of the input being provided by a participant controlling that cursor. In the example shown in FIG. 2, cursors 212A and 212C have an appearance indicating that the participants controlling cursors 212A and 212C are not actively providing input. In contrast, cursor 212B is represented by an icon indicating that the participant controlling cursor 212B is providing freeform graphical input. In this example, the participant controlling cursor 212B has made annotation 220.

Allowing any participant in a workgroup application session to annotate a document or otherwise provide input allows the workgroup application to better emulate the flow of a physical meeting. However, context information, such as who is providing input, is lost in the embodiment shown in FIG. 2.

To provide context information, participant indicators may be associated with inputs provided by each participant. FIG.

3 shows a user interface 300 with participant indicators. In this example, the participant indicators are visual indicators, here shown as icons 350A, 350B, 350C and 350D. Each participant may have a unique icon. The icon may include textual or graphical elements. In the pictured embodiment, each icon is a graphical representation of the participant. The representation may be a photograph, such as is illustrated by icon 350B. Alternatively, the icon may be an avatar such as is illustrated by icons 350C and 350D. In some embodiments, a participant indicator may incorporate a video clip of a participant. The video clip could be updated in real time during a workgroup application session based on a video captured by a webcam or other suitable device. Providing video of a participant captured during a session provides additional context information through facial expression of the participant. However, any suitable form of icon may be used, including text symbols or other icon that can be recognized by participants in a workgroup application session as being associated with a participant or subset of the participants.

Figure 3:
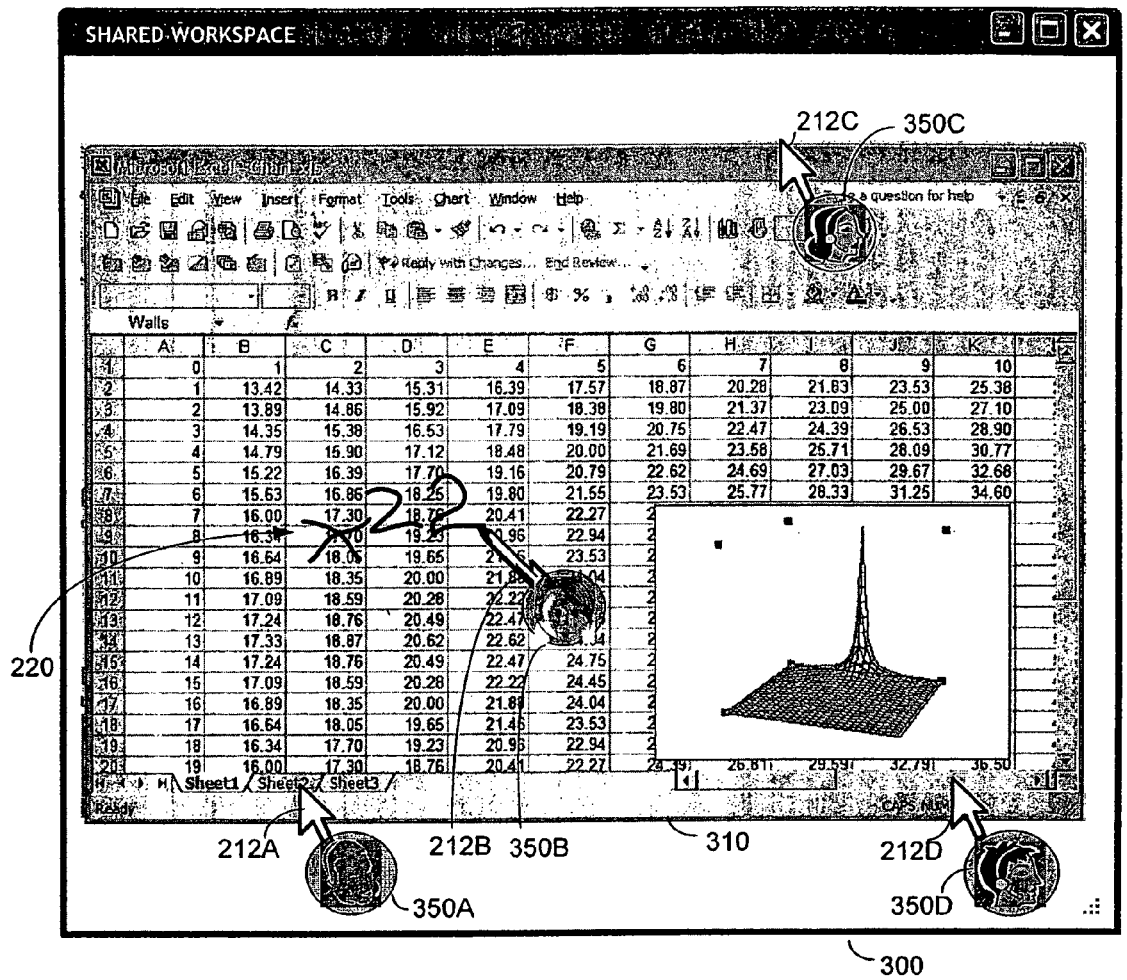
FIG. 3 is an alternative embodiment of a user interface that may appear on a user workstation during a session of a workgroup application.

The effects of input provided by a participant may be presented to the participants in the workgroup session in association with the participant indicator of the participant who provided the input. In FIG. 3, the participant corresponding to icon 350B is providing input to create annotation 220. Accordingly, cursor 212B controlled by that participant is shown in connection with icon 350B. As the participant controls cursor 212B, icon 350B will, in this embodiment, move in conjunction with cursor 212B.

Icons 350A, 350C and 350D, corresponding to other participants, are shown in conjunction with cursors 212A, 212C and 212D, respectively. In the illustrated embodiment, the participants that could control cursors 212A, 212C and 212D are not actively providing input at the time pictured in FIG. 3. Nonetheless, in the illustrated embodiment, each icon is shown in association with a cursor. Displaying the icons provides context information about other participants in the workgroup application session, even those not actively providing input.

Information needed for a client workgroup application component to display icons in conjunction with information provided by specific participants may be made available to a client component of a workgroup application in any suitable way. For example, network 100 (FIG. 1) may be operated according to a protocol that allows server 110 to identify a source for each input it receives. As server 110 forwards that input, or other commands based on that input, to the user work stations, it may forward a source identifier.

As part of an initial set up of a workgroup application session, or in any other suitable way, a participant, and therefore a participant icon, may be associated with each "source." As subsequent inputs are provided, each input may be associated with a source and therefore a specific participant icon. Each source may be a physical source, such as a user workstation, which may be identified by IP address. Alternatively, each source may be expressed as a connection, socket or other virtual identifier of the point of origination of the input.

As the workgroup client application component in each work station receives input in conjunction with a source identifier, it may present the information in any suitable fashion. The information may be presented in conjunction with a participant indicator associated with the source for the information.

In the embodiment of FIG. 3, each of the participant icons 350A . . . 350D has a position within user interface 300 dictated by the position of its associated cursor. The client component of the workgroup application for each of the user workstations will draw the display with the user icons layered on top of document window 310 or other information displayed as part of the workgroup application session. Layering of information on a graphical display is well known and conventional layering techniques, whether now known or hereafter developed, may be used to display each of the participant icons with the desired visual properties.

In some embodiments, each participant icon will be displayed with visual properties that reduce distraction caused to a participant viewing the display. For example, in the embodiment of FIG. 3, each participant icon 350A . . . 350D has a circular outline. Each participant icon may be cropped to fit in the circular outline. A circular outline reduces the total area obscured by the icon, but displays a picture of a face or other identifier of a person in a readily-identifiable fashion.

In addition, each participant icon may be displayed with less than 100 percent opacity. "Opacity" indicates the extent to which information on display layers below the icon remain visible. If icons are displayed with 100 percent opacity, information underlying the icon is completely obscured by the icon. As the opacity value decreases, the icon appears more transparent. When lower opacity settings are used, information underlying the icon is partially visible. In some embodiments, each of the icons will be displayed with an opacity of less than 90 percent but more than 25 percent. In some embodiments, each icon will be displayed with an opacity of approximately 70 percent, representing a setting in which the icon will be readily visible but an average human observer also can readily make out information on lower layers of the display. Opacity is a property that is frequently controlled when presenting information graphically on a display. Any suitable method of controlling opacity may be used to create user interface 300, including conventional opacity control techniques, whether now known or hereafter developed.

Figure 4:
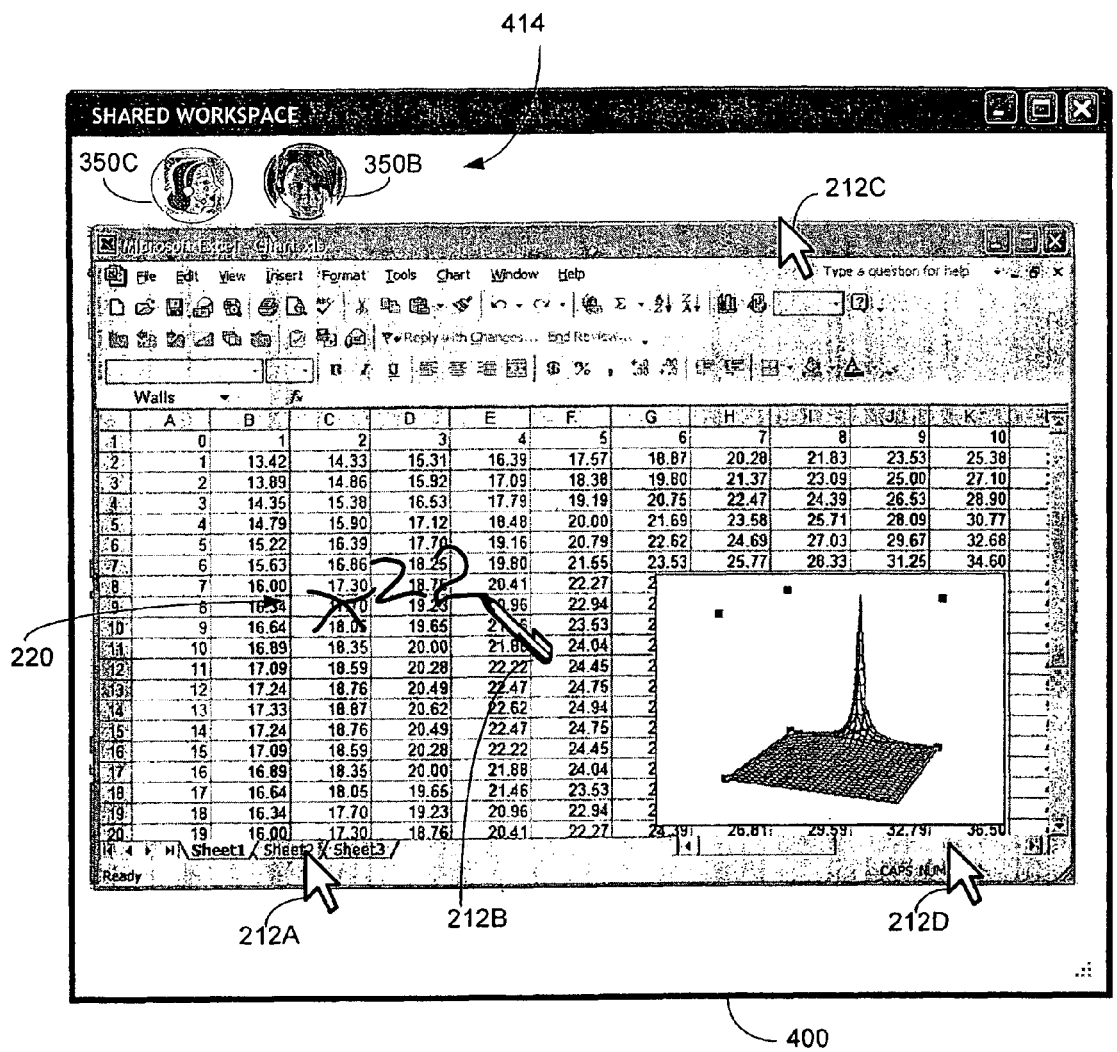
FIG. 4 is a sketch of a further alternative embodiment of a user interface that may appear on a user workstation during a session of a workgroup application.

FIG. 4 shows an alternative embodiment in which participant icons are associated with inputs provided by specific participants. In this embodiment, participants indicators are not displayed physically next to cursors. Here, participant indicators 350B and 350C are shown in region 414. In this embodiment, participant icons are shown in order in which each participant provides input. For example, participant indicator 350B may be displayed in a position indicating that is associated participant is currently providing input. Participant indicator 350C may be displayed in a position indicating that its associated participant who recently provided input.

Additionally or alternatively, participant icons may be displayed with visual properties identifying activity levels of participants. In the example of FIG. 4, opacity is used as an activity level indicator. As pictured, participant icon 350B has a relatively high opacity, indicating that the participant depicted by the icon is actively providing input. In contrast, participant indicator 350C is shown with a relatively low opacity, indicating that the participant depicted by icon 350C has not recently provided input. Where opacity is used as an activity indicator, each participant icon may be displayed throughout the session, but with the opacity modulated in response to the level of participation by the participant associated with the icon.

A simple approach to modulating the opacity associated with a participant may be to set the opacity of the participant icon to a maximum value when the participant provides input. Thereafter, the opacity of the participant icon may be decreased at a constant rate until the opacity reaches a minimum value or the user provides further input. However, any suitable method of determining the activity level of a participant may be used. For example, the activity level may be set based on a running average of the rate at which a participant provides input.

Figure 5:
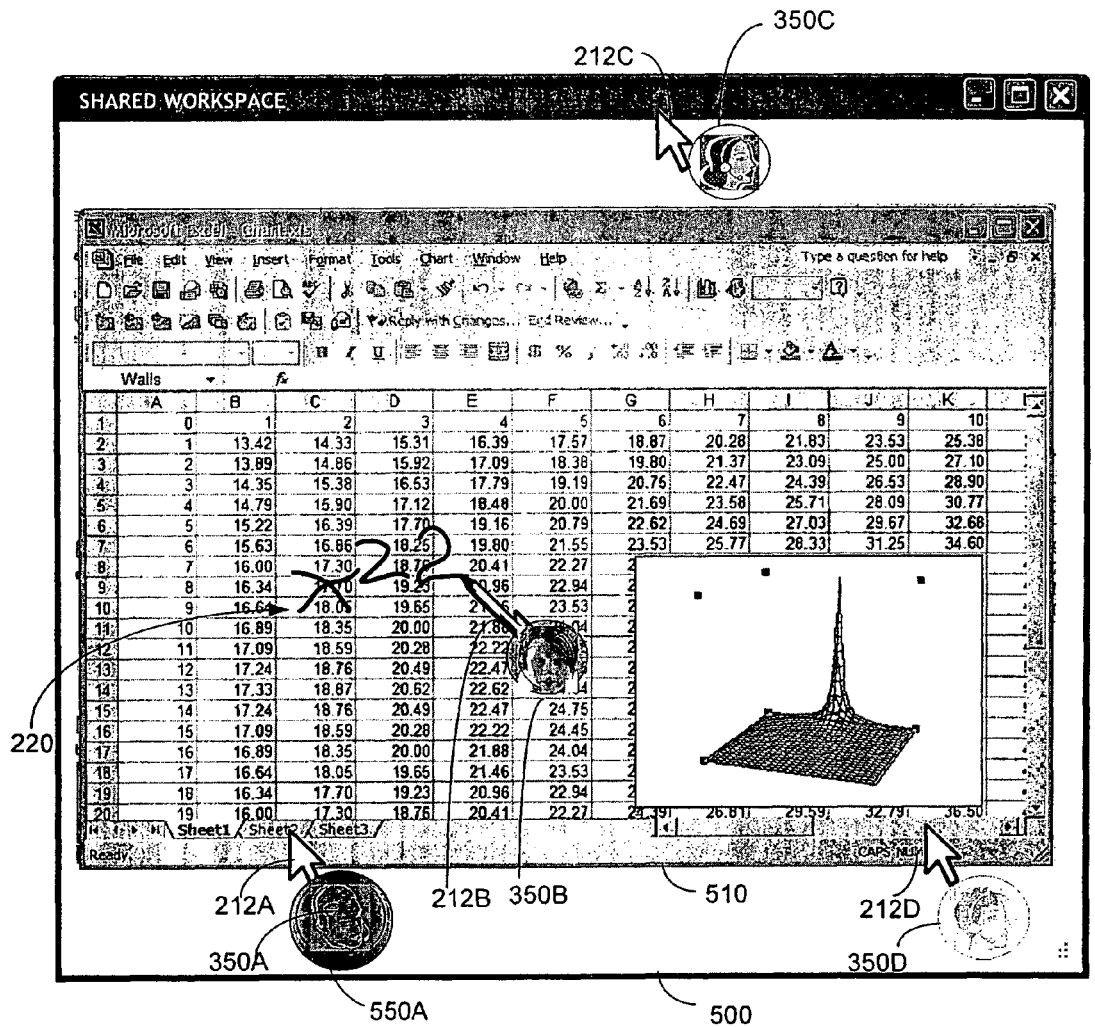
FIG. 5 is a sketch of a further alternative embodiment of a user interface that may appear on a user workstation during a session of a workgroup application.

Participant icons may be modulated in response to activity levels even if not displayed in a separate display area 414. In the embodiment of FIG. 5, participant indicators are displayed floating over document window 510 next to cursors controlled by their associated participants. Each participant icon is nonetheless modulated in response to an activity level.

In the embodiment of FIG. 5, participant icon 350B is shown with a high level of opacity, indicating that the participant represented by icon 350B is actively providing input to control cursor 212B to make annotation 220. In contrast, icon 350C is shown with a lower opacity, indicating that the participant represented by icon 350C has recently participated in the workgroup application session, but is not actively providing input. Icon 350D has an even lower level of opacity, indicating that the participant represented by icon 350D has been even less active in the workgroup application session than the participant represented by icon 350C.

Icon 350A illustrates a further method in which the visual properties of an icon may be modulated to reflect activity level. In this embodiment, icon 350A is shown to be "glowing" or is otherwise highlighted. Icon 350A may be made to appear to be glowing by placing an aura 550A or other visual artifact on a display layer below icon 350A.

In the illustrated embodiment, icon 350A is made to "glow" when the participant represented by icon 350A is speaking. The intensity, or other visual properties of aura 550A, may be modulated in response to a characteristic of a participant's speech. For example, the intensity may be modulated in response to the volume of the participant's speech. Providing visual indicators that are modulated in response to a characteristic of a participants' speech is another example of a contextual clue that can be used to filter information. In a workgroup session in which multiple participants talk simultaneously, participant icons that are modulated may be more readily matched to specific voices.

Figure 6:
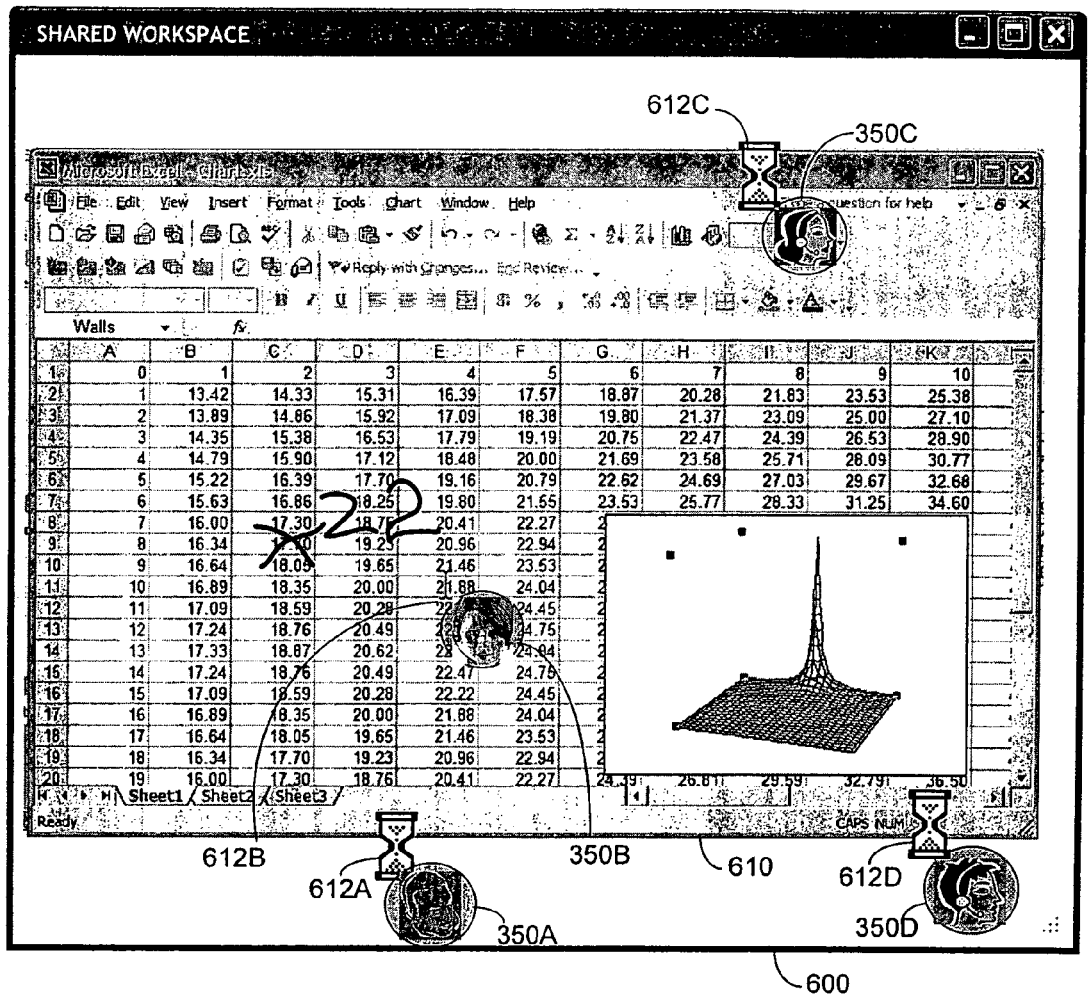
FIG. 6 is a sketch of a further alternative embodiment of a user interface that may appear on a user workstation during a session of a workgroup application.

FIG. 6 shows an alternative embodiment in which multiple cursors 612A, 612B, 612C and 612D are present in a user interface 600. In this embodiment, each of the cursors is associated with a participant to the workgroup session. The cursors 612A, 612B, 612C and 612D are here shown to take on shapes indicating the status of processing by the workgroup application. In the example of FIG. 6, cursor 612B has a shape indicating that the participant associated with icon 350B is inserting text in the document open in document window 610.

Cursors 612A, 612C and 612D are in a shape signifying that the workgroup application is in a state that it cannot receive input from the participants to the workgroup session who have control over those cursors. The workgroup application may enter this state because the participants controlling cursors 612A, 612C and 612D have entered commands or provided other inputs that are being processed. Alternatively, the workgroup application may enter a state in which it cannot receive input from the participants controlling cursors 612A, 612C and 612D because the participant controlling cursor 612B is actively providing input to a document or is otherwise providing input to perform an operation that cannot be interrupted by other participants.

Having thus described several aspects of at least one embodiment of this invention, it is to be appreciated that various alterations, modifications, and improvements will readily occur to those skilled in the art.

As one example, contextual clues are described as being provided in conjunction with a workgroup application while a virtual meeting is being conducted. The contextual clues may alternatively or additionally be provided in conjunction with a recorded workgroup application session. For example, a user who did not participate in a virtual meeting conducted with the workgroup application may review a recorded session of the meeting. As part of reviewing the recorded session, user indicators and user activity indicators may be displayed.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a workgroup application to facilitate collaboration among a plurality of participants, the workgroup application operating in a computer system having a plurality of work stations, each work station having a user interface associated therewith, the method comprising:
   a) receiving a first input from a participant through a user interface associated with a first work station of the plurality of work stations;
   b) receiving a second input from a second participant through a user interface associated with a second work station of the plurality of work stations; and
   c) simultaneously presenting a first participant indicator and a second participant indicator through displays associated with at least a portion of the plurality of work stations, the first and second participant indicators indicative of the first and second participants, respectively, the first and second participant indicators each having an opacity that varies between a minimum opacity of about 25 percent and a maximum opacity of about 90 percent,
   wherein,
      the first participant indicator and the second participant indicator are presented on the displays associated with the at least a portion of the plurality of work stations with a spatial ordering corresponding to a temporal ordering in which the first input and the second input are received, and
      an opacity of the first participant indicator is based on a running average of a rate at which the first participant provides inputs.

2. The method of operating a workgroup application of claim 1, wherein receiving the first input from the first participant comprises receiving an indication that the first participant has manipulated a pointing device.

3. The method of operating a workgroup application of claim 1, wherein receiving the second input from the second participant comprises receiving text input.

4. The method of operating a workgroup application of claim 1, wherein the first participant indicator comprises an icon of the first participant, the icon having a circular outline.

5. The method of operating a workgroup application of claim 1, additionally comprising:
   d) displaying the first participant indicator other than while presenting an output in response to the input from the participant; and
   e) altering an opacity of the first participant indicator in response to a level of activity of the first participant.

6. The method of operating a workgroup application of claim 5, wherein altering the opacity of the participant indicator comprises decreasing the opacity of the participant indicator until a minimum opacity is reached or the participant provides a next input.

7. The method of operating a workgroup application of claim 6, wherein altering the opacity of the participant indicator comprises setting the opacity to a maximum opacity when the participant provides the next input.

8. The method of operating a workgroup application of claim 1, wherein the first input is a voice input and presenting the first participant indicator comprises highlighting the first participant indicator with an aura, the method further comprising:
   d) modulating an intensity of the aura in response to a characteristic of the voice input.

9. The method of operating a workgroup application of claim 8, wherein the characteristic of the voice input with which the intensity of the aura is modulated is a volume of the voice input.

10. A method of operating a workgroup application to facilitate collaboration among a plurality of participants, the workgroup application operating in a computer system having a plurality of participants, the workgroup application operating in a computer system having a plurality of work stations, each work station having a user interface associated therewith, the method comprising:
    a) displaying a plurality of cursors through the user interfaces associated with each work station of at least a portion of the plurality of work stations, each cursor being responsive to input from a respective participant of the plurality of participants; and
    b) displaying a plurality of participant indicators, each participant indicator being displayed as an icon having a circular outline and moving in synchronization with a respective cursor of the plurality of cursors, each participant indicator being representative of the respective participant of the respective cursor,
    wherein at least a portion of the plurality of cursors are displayed with a visual appearance indication that the workgroup application cannot receive input from the respective participants, irrespective of whether the workgroup application can receive input from other participants,
    displaying the plurality of participant indicators comprises displaying, for each of at least a portion of the plurality of participant indicators, the icon having an opacity between about 25 percent and about 90 percent,
    the at least a portion of the plurality of participant indicator are presented through the user interfaces associated with each work station of the at least a portion of the plurality of work stations with a spatial ordering corresponding to a temporal ordering in which inputs of the respective participants are received, and
    opacities of the at least a portion of the plurality of participant indicators are based on running averages of rates at which the respective participants provide inputs.

11. The method of operating a workgroup application of claim 10, wherein displaying a plurality of participant indicators comprises displaying, for each of at least a portion of the plurality of participant indicators, an avatar of the participant within the circular outline.

12. The method of operating a workgroup application of claim 10, wherein displaying a plurality of participant indicators comprises displaying, for each of at least a portion of the plurality of participant indicators, the icon having an opacity that decreases until a minimum opacity is reached or until the respective participant provides a next input.

13. A computer-readable storage device having computer-executable instructions for controlling a client computer in a networked computer system to provide a user interface to a local participant in a workgroup application session with a plurality of other participants, the computer-executable instructions for performing steps comprising:

a) receiving, first information associated with a first input from a first participant among the plurality of other participants;
b) receiving second information associated with a second input from a second participant among the plurality of other participants;
c) presenting the first and second information for the local participant; and
d) simultaneously presenting a first participant indicator and a second participant indicator on a display of the client computer, the first and second participant indicators indicative of the first and second participants, respectively, the first and second participant indicators each having an opacity that varies between a minimum opacity of about 25 percent and a maximum opacity of about 90 percent, wherein
the first participant indicator and the second participant indicator are presented on the display with a spatial ordering corresponding to the temporal ordering in which the first input and the second input are received, and
an opacity of the first participant indicator is based on a running average of a rate at which the first participant provides inputs.

14. The computer-readable storage device of claim 13, additionally comprising computer-executable instructions for performing the method comprising:
e) receiving voice input from the local participant; and
f) transmitting message packets representative of the voice input from the local participant.

15. The computer-readable storage device of claim 14, wherein:
the received the first information comprises message packets representative of a voice input from the first participant; and
presenting the first information comprises converting the message packets to audio output presented to the local participant; and the steps further comprising:
g) highlighting the first participant indicator by modulating an intensity of an aura of the first participant indicator in response to a characteristic of the voice input.

* * * * *